(12) United States Patent
Olson et al.

(10) Patent No.: US 7,547,467 B2
(45) Date of Patent: Jun. 16, 2009

(54) BRIGHTNESS ENHANCING FILM AND METHODS OF SURFACE TREATING INORGANIC NANOPARTICLES

(75) Inventors: David B. Olson, Marine on St. Croix, MN (US); Clinton L. Jones, Somerset, WI (US); Brant U. Kolb, Afton, MN (US); Emily S. Goenner, Shoreview, MN (US); Mark J. Hendrickson, Minneapolis, MN (US); Taun L. McKenzie, Hugo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 266 days.

(21) Appl. No.: 11/559,543

(22) Filed: Nov. 14, 2006

(65) Prior Publication Data

US 2007/0112097 A1 May 17, 2007

Related U.S. Application Data (60) Provisional application No. 60/737,000, filed on Nov. 15, 2005.

(51) Int. Cl.
C09K 19/00 (2006.01)
C08K 9/04 (2006.01)
C08K 9/12 (2006.01)
G02B 5/30 (2006.01)

(52) U.S. Cl. .................. 428/1.3; 428/1.1; 428/1.51; 428/1.54; 428/1.55; 428/147; 428/148; 428/500; 523/202; 523/210; 977/773

(58) Field of Classification Search .......... 428/1.1, 428/500, 1.3, 1.51, 1.54, 1.55, 147, 148; 524/413, 430, 437, 493, 558, 559; 977/773; 523/202, 210
See application file for complete search history.

(56) References Cited

U.S. PATENT DOCUMENTS

| | | | |
|---|---|---|---|
| 5,135,967 A * | 8/1992 | Aumann et al. ............ 523/210 | |
| 6,251,505 B1 | 6/2001 | Rakos et al. | |
| 6,261,700 B1 | 7/2001 | Olson et al. | |
| 6,291,070 B1 | 9/2001 | Arpac et al. | |
| 6,329,058 B1 | 12/2001 | Arney et al. | |
| 6,376,590 B2 | 4/2002 | Kolb et al. | |
| 6,387,981 B1 | 5/2002 | Zhang et al. | |
| 6,432,526 B1 | 8/2002 | Arney et al. | |
| 6,521,677 B2 | 2/2003 | Yashiro et al. | |
| 6,593,392 B2 | 7/2003 | Wang | |
| 6,599,443 B1 | 7/2003 | Sharples et al. | |
| 6,599,631 B2 | 7/2003 | Kambe et al. | |
| 6,656,990 B2 | 12/2003 | Shustack et al. | |
| 6,720,085 B2 | 4/2004 | Ito et al. | |
| 6,760,157 B1 | 7/2004 | Allen et al. | |
| 6,844,950 B2 | 1/2005 | Ja Chisholm et al. | |
| 7,074,463 B2 | 7/2006 | Jones et al. | |
| 2003/0129385 A1 | 7/2003 | Hojo et al. | |
| 2003/0165680 A1 | 9/2003 | Brady et al. | |
| 2003/0175004 A1 | 9/2003 | Garito et al. | |
| 2003/0180029 A1 | 9/2003 | Garito et al. | |
| 2004/0132858 A1 | 7/2004 | Chisholm et al. | |
| 2004/0233526 A1 | 11/2004 | Kaminsky et al. | |
| 2005/0063898 A1 | 3/2005 | Ja Chisholm | |
| 2005/0136252 A1 | 6/2005 | Chisholm et al. | |
| 2005/0200278 A1 | 9/2005 | Jones et al. | |
| 2006/0128853 A1 | 6/2006 | Olson | |
| 2006/0204676 A1 | 9/2006 | Jones et al. | |
| 2006/0204745 A1 | 9/2006 | Jones et al. | |
| 2006/0210726 A1 | 9/2006 | Jones et al. | |

FOREIGN PATENT DOCUMENTS

| | | |
|---|---|---|
| EP | 1 510 557 | 2/2005 |
| WO | WO 00/06495 | 2/2000 |
| WO | WO 02/45129 | 6/2002 |
| WO | WO 03/045846 | 6/2003 |

* cited by examiner

*Primary Examiner*—Shean C Wu
(74) *Attorney, Agent, or Firm*—Carolyn A. Fischer (57) ABSTRACT

Presently described are (e.g. brightness enhancing film) optical articles comprising the reaction product of a polymerizable resin and surface modified inorganic nanoparticles, methods of surface modifying inorganic nanoparticles, and surface modified inorganic nanoparticles. The surface treatment comprises at least one monocarboxylic acid having a refractive index of at least 1.50 and/or at least one monocarboxylic acid having a Mn of at least 200 g/mole and an ethylenically unsaturated group and/or at least one dicarboxylic acid.

21 Claims, 1 Drawing Sheet

US 7,547,467 B2

BRIGHTNESS ENHANCING FILM AND METHODS OF SURFACE TREATING INORGANIC NANOPARTICLES

CROSS REFERENCE TO RELATED APPLICATIONS

This application claims the benefit of U.S. Provisional Application Serial No. 60/737,000, filed Nov. 15, 2005.

BACKGROUND

Certain microreplicated optical products, such as described in U.S. Pat. Nos. 5,175,030 and 5,183,597, are commonly referred to as a "brightness enhancing films". Brightness enhancing films are utilized in many electronic products to increase the brightness of a backlit flat panel display such as a liquid crystal display (LCD) including those used in electroluminescent panels, laptop computer displays, word processors, desktop monitors, televisions, video cameras, as well as automotive and aviation displays.

Brightness enhancing films desirably exhibit specific optical and physical properties including the index of refraction of a brightness enhancing film that is related to the brightness gain (i.e. "gain") produced. Improved brightness can allow the electronic product to operate more efficiently by using less power to light the display, thereby reducing the power consumption, placing a lower heat load on its components, and extending the lifetime of the product.

Brightness enhancing films have been prepared from high index of refraction monomers that are cured or polymerized, as described for example in U.S. Pat. Nos. 5,908,874; 5,932,626; 6,107,364; 6,280,063; 6,355,754; as well as EP 1 014113 and WO 03/076528.

U.S. Pat. No. 6,376,590 describes a zirconia sol and composite materials made from the zirconia sols.

Brightness enhancing films have been prepared from polymerizable resin compositions comprising inorganic particles, such as zirconia, silica, and titania, as described in U.S. Pat. No. 6,844,950; and U.S. Publication Nos. 2005/0059766, 2005/0151119, and Published U.S. Patent Application Nos. 2006/0055918, 2006/0204676, 2006/0204745 and 2006/0210726.

SUMMARY OF THE INVENTION

Presently described are (e.g. brightness enhancing film) optical articles comprising the reaction product of a polymerizable resin and surface modified inorganic nanoparticles, methods of surface modifying inorganic nanoparticles, and surface modified inorganic nanoparticles.

In one embodiment, (e.g. brightness enhancing) optical articles are described comprising the reaction product of a polymerizable resin composition including inorganic nanoparticles having a surface treatment that comprises at least one monocarboxylic acid having a refractive index of at least 1.50. The high refractive index surface treatment typically comprises an aromatic group such as a phthalate group. In one embodiment, the surface treatment is a monophthalic acid ester.

In another embodiment, a method of surface modifying inorganic nanoparticles is described. The method comprises combining inorganic nanoparticles with a surface treatment comprising at least one polar group containing (e.g. polyether) monocarboxylic acid in combination with one or more surface treatments selected from i) at least one monocarboxylic acid compatibilizer having a refractive index of at least 1.50;
ii) at least one monocarboxylic acid having a Mn of at least 200 g/mole and at least one ethylenically unsaturated group; and
iii) at least one dicarboxylic acid.

In another embodiment, inorganic nanoparticles are described that are surface modified with the surface treatments just described.

In yet other embodiments, (e.g. brightness enhancing) optical articles are described comprising the reaction product of a polymerizable resin composition including the surface modified inorganic nanoparticles just described.

The inorganic nanoparticles typically comprise absorbed acid on their surface. The absorbed acid may be a volatile acid such as acrylic acid, methacrylic acid, acetic acid. After surface modification, the adsorbed volatile acid content of the (e.g. brightness enhancing film) optical article is typically less than 3 wt-%. Further, the non-volatile acid (i.e. the various monocarboxylic acid compatibilizers described herein) content can range up to about 15 wt-%. The surface treatment is typically free of silane.

DETAILED DESCRIPTION OF PREREFFED EMBODIMENTS

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. The height of the prisms typically ranges from about 1 to about 75 microns. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

Brightness enhancing films include microstructure-bearing articles having a regular repeating pattern of symmetrical tips and grooves. Other examples of groove patterns include patterns in which the tips and grooves are not symmetrical and in which the size, orientation, or distance between the tips and grooves is not uniform. Examples of brightness enhancing films are described in Lu et al., U.S. Pat. No. 5,175,030, and Lu, U.S. Pat. No. 5,183,597, incorporated herein by reference.

Figure 1:
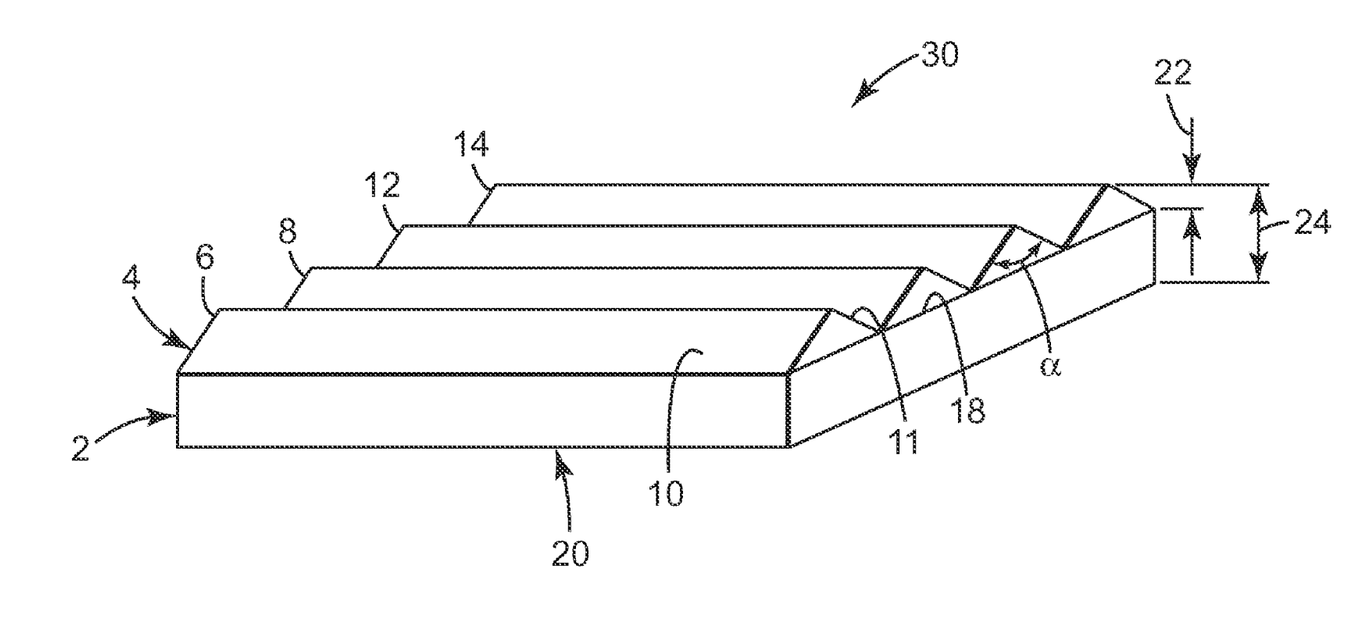
FIG. 1 is a perspective view of an illustrative microstructure-bearing optical product of the present invention.

Referring to FIG. 1, a brightness enhancing film 30 may comprise a base layer 2 and optical layer 4. Optical layer 4 comprises a linear array of regular right prisms, identified as prisms 6, 8, 12, and 14. Each prism, for example, prism 6, has a first facet 10 and a second facet 11. The prisms 6, 8, 12, and 14 are formed on base 2 that has a first surface 18 on which the prisms are formed and a second surface 20 that is substantially flat or planar and opposite first surface 18. By right prisms it is meant that the apex angle α is typically about 90°. However, this angle can range from 70° to 120° and may range from 80° to 100°. Further the apexes can be sharp, rounded, flattened or truncated. The prism facets need not be identical, and the prisms may be tilted with respect to each other. The relationship between the total thickness 24 of the optical article, and the height 22 of the prisms, may vary. However, it is typically desirable to use relatively thinner optical layers with well-defined prism facets. A typical ratio of prism height 22 to total thickness 24 is generally between 25/125 and 2/125.

The base layer of the brightness enhancing film can be of a nature and composition suitable for use in an optical product, i.e. a product designed to control the flow of light. Many materials can be used as a base material provided the material is sufficiently optically clear and is structurally strong enough to be assembled into or used within a particular optical product. Preferably, the base material is chosen that has sufficient resistance to temperature and aging that performance of the optical product is not compromised over time.

The particular chemical composition and thickness of the base material for any optical product can depend on the requirements of the particular optical product that is being constructed. That is, balancing the strength, clarity, temperature resistance, surface energy, adherence to the optical layer, among others. The thickness of the base layer is typically at least about 0.025 millimeters (mm) and more typically at least about 0.25 mm. Further, the base layer generally has a thickness of no more than about 1 mm.

Useful base layer materials include cellulose acetate butyrate, cellulose acetate propionate, cellulose triacetate, polyether sulfone, polymethyl methacrylate, polyurethane, polyester, polycarbonate, polyvinyl chloride, syndiotactic polystyrene, polyethylene naphthalate, copolymers or blends based on naphthalene dicarboxylic acids, and glass. Optionally, the base material can contain mixtures or combinations of these materials. For example, the base may be multi-layered or may contain a dispersed phase suspended or dispersed in a continuous phase. Exemplary base layer materials include polyethylene terephthalate (PET) and polycarbonate. Examples of useful PET films include photograde polyethylene terephthalate (PET) and PET commercially available from DuPont Films of Wilmington, Del., under the trade designation "Melinex".

The base layer material can be optically active, and can act as a polarizing material. A number of base layer materials are known to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120, each incorporated herein by reference. The use of these polarizer films in combination with a brightness enhancement film has been described in U.S. Pat. No. 6,111,696; incorporated herein by reference. Another example of a polarizing film is described in U.S. Pat. No. 5,882,774; incorporated herein by reference. Multilayer polarizing films are sold by 3M Company, St. Paul, Minn. under the trade designation DBEF (Dual Brightness Enhancement Film). The use of such multilayer polarizing optical film in a brightness enhancement film has been described in U.S. Pat. No. 5,828,488; incorporated herein by reference.

Other polarizing and non-polarizing films can also be useful as the base layer for brightness enhancing films of the invention such as described in U.S. Pat. Nos. 5,612,820 and 5,486,949, among others.

In one embodiment, a brightness enhancing film comprising a polymerized structure is described. The polymerized structure can be an optical element or optical product constructed of a base layer and an optical layer. The base layer and optical layer can be formed from the same or different polymer material. The polymerized structure comprises the reaction production of a polymerizable resin composition and surface modified inorganic nanoparticles dispersed with the polymerizable resin composition.

Surface modified (e.g. colloidal) nanoparticles are present in the polymerized structure in an amount effective to enhance the durability and/or refractive index of the article or optical element. The total amount of surface modified inorganic nanoparticles can be present in the polymerizable resin or optical article in an amount of at least 10 wt-%, 20 wt-%, 30 wt-% or 40 wt-%. The concentration is typically less than to 70 wt-%, and more typically less than 60 wt-% in order that the polymerizable resin composition has a suitable viscosity for use in cast and cure processes of making microstructured films.

The size of such particles is chosen to avoid significant visible light scattering. It may be desirable to employ a mixture of inorganic oxide particle types to optimize an optical or material property and to lower total composition cost. The surface modified colloidal nanoparticles can be oxide particles having a (e.g. unassociated) primary particle size or associated particle size of greater than 1 nm, 5 nm or 10 nm. The primary or associated particle size is generally and less than 100 nm, 75 nm, or 50 nm. Typically the primary or associated particle size is less than 40 nm, 30 nm, or 20 nm. It is preferred that the nanoparticles are unassociated. Their measurements can be based on transmission electron miscroscopy (TEM). The nanoparticles can include metal oxides such as, for example, alumina, zirconia, titania, mixtures thereof, or mixed oxides thereof. Surface modified colloidal nanoparticles can be substantially fully condensed.

Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray defraction techniques. Condensed crystalline (e.g. zirconia) nanoparticles have a high refractive index whereas amorphous nanoparticles typically have a lower refractive index.

Zirconia and titania nanoparticles can have a particle size from 5 to 50 nm, or 5 to 15 nm, or 8 nm to 12 nm. Zirconia nanoparticles can be present in the durable article or optical element in an amount from 10 to 70 wt-%, or 30 to 60 wt-%. Zirconias for use in composition and articles of the invention are available from Nalco Chemical Co. under the trade designation "Nalco OOSSOO8" and from Buhler AG Uzwil, Switzerland under the trade designation "Buhler zirconia Z-WO sol".

The zirconia particles can be prepared using hydrothermal technology as described in Published U.S. Patent Application No. 2006/0148950; incorporated herein by reference. More specifically, a first feedstock that contains a zirconium salt is subjected to a first hydrothermal treatment to form a zirconium-containing intermediate and a byproduct. A second feedstock is prepared by removing at least a portion of the byproduct formed during the first hydrothermal treatment. The second feedstock is then subjected to a second hydrothermal treatment to form a zirconia sol that contains the zirconia particles.

The first feedstock is prepared by forming an aqueous precursor solution that contains a zirconium salt. The anion of the zirconium salt is usually chosen so that it can be removed during subsequent steps in the process for preparing the zirconia sol. Additionally, the anion is often chosen to be non-corrosive, allowing greater flexibility in the type of material chosen for the processing equipment such as the hydrothermal reactors.

In one method of at least partially removing the anions in the precursor solution, the precursor solution can be heated to vaporize an acidic form of the anion. For example, a carboxylate anion having no more than four carbon atoms can be removed as the corresponding carboxylic acid. More specifically, an acetate anion can be removed as acetic acid. Although the free acetic acid can be removed, at least a portion of the acetic acid is typically adsorbed on the (e.g. zirconia) nanoparticle surface. Thus, the nanoparticles typically comprise adsorbed volatile acid.

Presently described are (e.g. brightness enhancing film) optical articles comprising the reaction product of a polymerizable resin and surface modified inorganic nanoparticles, methods of surface modifying inorganic nanoparticles, and surface modified inorganic nanoparticles.

The overall objective of the surface modification of the inorganic particles is to provide resins with homogeneous components and preferably a low viscosity that can be prepared into films (e.g. using cast and cure processes) with high brightness improvement.

Surface modification involves attaching surface modification agents to inorganic oxide (e.g. zirconia) particles to modify the surface characteristics. The nanoparticles are often surface-modified to improve compatibility with the organic matrix material. The surface-modified nanoparticles are often non-associated, non-agglomerated, or a combination thereof in an organic matrix material. The resulting light management films that contain these surface-modified nanoparticles tend to have high optical clarity and low haze. The addition of these surface-modified nanoparticles can increase the gain of brightness enhancement film compared to films that contain only polymeric material.

Various surface treatment agents are employed. In one aspect, a monocarboxylic acid having a high refractive index (e.g. of at least 1.50) is employed. In another aspect, a monocarboxylic acid is employed that has a high molecular weight (e.g. Mn of at least 200 g/mole) and one or more ethylenically unsaturated groups (e.g. that are copolymerizable with the polymerizable resin). In another aspect, at least one dicarboxylic acid is employed. Each of these monocarboxylic acid surface treatments just described are typically employed in combination with a water soluble (e.g. polyether) monocarboxylic acid.

It is surmised that the volatile acid (e.g. acetic acid) adsorbed on the surface of the nanoparticles is displaced by these various (e.g. non-volatile) carboxylic acid(s). The polymerized structure (e.g. brightness enhancing film) may also be subjected to addition processes steps (e.g. heat treatment) to reduce the volatile acid content. Although, a detectable amount may be present (0.01 wt-% to 0.1 wt-%), the volatile acid content of the brightness enhancing film is generally less than 3 wt-%. The non-volatile acid content may be substantially higher, ranging up to about 15 wt-%.

The monocarboxylic acid surface treatments preferably comprise a compatibilizing group. The monocarboxylic acids may be represented by the formula A-B where the A group is a carboxylic acid group capable of attaching to the surface of a (e.g. zirconia or titania) nanoparticle, and B is a compatibilizing group that comprises a variety of different functionalities. The carboxylic acid group can be attached to the surface by adsorption and/or formation of an ionic bond. The compatibilizing group B is generally chosen such that it is compatible with the polymeric or polymerizable resin of the (e.g. brightness enhancing) optical article. The compatibilizing group B can be reactive or nonreactive and can be polar or non-polar.

Compatibilizing groups B that can impart non-polar character to the zirconia particles include, for example, linear or branched aromatic or aliphatic hydrocarbons. Representative examples of non-polar modifying agents having carboxylic acid functionality include octanoic acid, dodecanoic acid, stearic acid, oleic acid, and combinations thereof.

The compatibilizing group B may optionally be reactive such that it can copolymerizable with the organic matrix of the (e.g. brightness enhancing) optical article. For instance, free radically polymerizable groups such as (meth)acrylate compatibilizing groups can copolymerize with (meth)acrylate functional organic monomers to generate brightness enhancement articles with good homogeneity.

The surface treatment typically comprises at least one monocarboxylic acid (i.e., containing one carboxylic acid group per molecule) having a (e.g. polyether) water soluble tail. Such surface treatment can impart polar character to the zirconia or titania particles. The polyether tail comprises repeating difunctional alkoxy radicals having the general formula —O—R—. Preferred R groups have the general formula —$C_n H_{2n}$— and include, for example, methylene, ethylene and propylene (including n-propylene and i-propylene) or a combination thereof. Combinations of R groups may be provided, for example, as random, or block type copolymers.

A preferred class of monocarboxylic acids may be represented generally by the following formula:

wherein

X is a divalent organic linking group;

x ranges from about 1-10; and y ranges from about 1-4.

Representative examples of X include —$X_2$—$(CH_2)_n$— where $X_2$ is —O——S—, —C(O)O—, —C(O)NH— and wherein n ranges from about 1-3.

Examples of preferred polyether carboxylic acids include 2-[2-(2-methoxyethoxy)ethoxy]acetic acid having the chemical structure $CH_3O(CH_2CH_2O)_2CH_2COOH$ (hereafter MEEAA) and 2-(2-methoxyethoxy)acetic acid having the chemical structure $CH_3OCH_2CH_2OCH_2COOH$ (hereafter MEAA). MEAA and MEEAA are commercially from Aldrich Chemical Co., Milwaukee, Wis. as catalog numbers 40,701-1 and 40,700-3, respectively.

Other surface modifiers with polyether compatibilizing tails can also be usefully employed in this application. Examples of molecules potentially of use in this application are succinic acid mono-[2-(2-methoxy-ethoxy)-ethyl]ester, maleic acid mono-[2-(2-methoxy-ethoxy)-ethyl]ester, and glutaric acid mono-[2-(2-methoxy-ethoxy)-ethyl]ester. These molecules are shown as follows:

Phthalic acid mono-(2-acryloyloxy-ethyl) ester

Phthalic acid mono-(2-phenylsulfanyl-ethyl) ester

Phthalic acid mono-(2-phenoxy-ethyl) ester

Phthalic acid mono-[2-(2-methoxy-ethoxy)-ethyl] ester

It is also within the scope of this invention to utilize a mixture of more than one polyether carboxylic acid.

In some aspects, a water soluble (e.g. polyether) monocarboxylic acid surface treatment is employed in combination with at least one dicarboxylic acid. The dicarboxylic acid is preferably relatively low in molecular weight. The dicarboxylic acid may be linear or branched. Dicarboxylic acids having up to 6 carbon atoms between the carboxylic acids groups are preferred. These include for example maleic acid, succinic acid, suberic acid, phthalic acid, and itaconic acid.

In other aspects, at least one water soluble (e.g. polyether) monocarboxylic acid surface treatment is employed in combination with a copolymerizable monocarboxylic acid surface treatment having a relatively high molecular weight (e.g. higher than BCEA). The molecular weight (Mn) of the surface treatments is typically greater than 200 g/mole. Useful surface treatments generally have a molecular weight of less than 500 g/mole and preferably less than 350 g/mole. The copolymerizable monocarboxylic acid further comprises ethylenically unsaturated groups such as (meth)acryl and (meth)acrylate groups. Examples of high molecular weight surface modification agents of this type are succinic acid mono-(2-acryloyloxy-ethyl)ester, maleic acid mono-(2-acryloyloxy-ethyl)ester, and glutaric acid mono-(2-acryloyloxy-ethyl)ester.

In other aspects, compatibilizers with a relatively high refractive index (e.g. RI is at least 1.50) can be advantageous in the preparation of optical articles such as brightness enhancement films. Compatibilizers containing one or more aromatic groups, such as phthalate groups, advantageously have a high refractive index and thus the inclusion of such can raise the refractive index of the overall polymerizable composition. Other methods of raising the refractive index include the inclusion of sulfur or bromine atoms into the surface modifier molecules.

Various phthalate based material, such as phthalic acid mono-(2-acryloxy-ethyl) ester, are known, and can be produced by the reaction schemes as follows.

In many instances it is possible to employ monocarboxylic acid surface modifying agents that have more than one desirable feature. For example, in one aspect a surface treatment may be employed that has a high refractive index (such as by inclusion of an aromatic group) that is also copolymerizable (such as by the inclusion of a free radically polymerizable group such as a (meth)acryl group). Phthalic acid mono-(2-acryloyloxy-ethyl) ester is an example of such a surface treatment. As yet another example, a surface treatment may be employed that has high refractive index (such as by inclusion of an aromatic group) in combination with a polyether compatibilizing group. Phthalic acid mono-[2-(2-methoxy-ethoxy)-ethyl]ester is an example of such a surface treatment. These two molecules are prepared via the reaction of phthalic anhydride and an aliphatic alcohol in the presence of a catalyst. Other similar and potentially useful compatibilizers can be prepared from anhydrides (succinic, maleic, phthalic, glutaric, etc) and aliphatic alcohols.

In preferred embodiments, the surface treatment comprises a combination of at least one water soluble monocarboxylic acid compatibilizer (e.g. having a polyether or polyester tail) and at least one high refractive index compatibilizer that copolymerizes with the organic monomers in the resin of the (e.g. brightness enhancing) optical film. Additional compatibilizers can be used to improve various resin and film properties such as resin viscosity and refractive index, and film brightness gain.

The surface treatment can include yet other surface treatment agents including for example other acids such as other carboxylic acids as well as sulfonic acids, phosphonic acids, alcohols, amines, and titanates.

The surface modification of the particles in the colloidal dispersion can be accomplished in a variety of ways. The process generally involves the mixture of an inorganic particle dispersion with surface modifying agents. Optionally, a co-solvent can be added at this point, such as for example, 1-methoxy-2-propanol, ethanol, isopropanol, ethylene glycol, N,N-dimethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing.

The surface modified particles can then be incorporated into the curable (i.e. polymerizable) resin compositions in various methods. In a preferred aspect, a solvent exchange procedure is utilized whereby the resin is added to the surface modified sol, followed by removal of the water and co-solvent (if used) via evaporation, thus leaving the particles dispersed in the polymerizable resin. The evaporation step can be accomplished for example, via distillation, rotary evaporation or oven drying. In another aspect, the surface modified particles can be extracted into a water immiscible solvent followed by solvent exchange, if so desired. Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

The surface modified inorganic nanoparticles of the present invention may be combined with organic matrix materials, for example, monomers, oligomers and polymers by the various techniques discussed above. The resultant composite material can have the properties of optical clarity, high refractive index combined with high modulus, hardness, and the processibility and flexibility of the polymer matrix. In general, the refractive index of a composite material increases linearly with volume fraction of the zirconia particles in the organic matrix. To obtain a high index of refraction, an organic matrix material having a high index of refraction is generally preferred. Zirconia particles from the zirconia sol of the present invention may be used to further increase the refractive index of the organic matrix.

Representative examples of polymerizable monomers include acrylates, methacrylates, styrenes, epoxies and the like. Also, reactive oligomers such as acrylated or methacrylated polyesters, polyurethanes or acrylics may also be used. The resulting composite material may be shaped or coated and then polymerized, for example, via a free-radical photopolymerization mechanism. Photopolymerization may be initiated by the use of a photoinitiator such as that commercially available under the trade designation "IRGACURE 184" (Ciba Specialty Chemicals, Tarrytown, N.Y.). The surface modified nanoparticles combined with other types of polymers, for example, polyolefins, polyesters, polyurethanes, polymethylmethacrylates, polystyrenes, polycarbonates and polyimides. Suitable techniques for combining the sol with a thermoplastic polymer include, for example, extrusion, milling or Braebender mixing. Surface modification agents should be selected to be stable at the desired processing temperature.

Various polymerizable resin compositions useful for optical articles and in particular the optical layer of a brightness enhancing film are known such as described in U.S. Patent Publication No. 2005/0200278 and Published U.S. Patent Application No. 2006/0204676; incorporated herein by reference.

The polymerizable compositions are preferably substantially solvent free, i.e. the compositions contain less than 5 wt-%, 4 wt-%, 3 wt-%, 2 wt-%, 1 wt-%, and 0.5 wt-% of (e.g. organic) solvent. The concentration of solvent can be determined by known methods, such as gas chromatography. Solvent concentrations of less than 0.5 wt-% are preferred.

The components of the organic component are preferably chosen such that the organic component has a low viscosity. Typically the viscosity of the organic component is substantially lower than the organic component of compositions previously employed. The viscosity of the organic component is less than 1000 cps and typically less than 900 cps. The viscosity of the organic component may be less than 800 cps, less than 450 cps, less than 600 cps, or less than 500 cps at the coating temperature. As used herein, viscosity is measured (at a shear rate up to 1000 sec-1) with 25 mm parallel plates using a Dynamic Stress Rheometer. Further, the viscosity of the organic component is typically at least 10 cps, more typically at least 50 cps, even more typically at least 100 cps, and most typically at least 200 cps at the coating temperature.

The coating temperature typically ranges from ambient temperature, (i.e. 25° C.) to 180° F. (82° C.). The coating temperature may be less than 170° F. (77° C.), less than 160° F. (71° C.), less than 150° F. (66° C.), less than 140° F. (60° C.), less than 130° F. (54° C.), or less than 120° F. (49° C.). The organic component can be a solid or comprise a solid component provided that the melting point in the polymerizable composition is less than the coating temperature. The organic component can be a liquid at ambient temperature.

The organic component as well as the polymerizable composition has a refractive index of at least 1.47, for most product applications; whereas the polymerizable resin composition of a turning film may have a refractive index as low as 1.44. The refractive index of the organic component or the polymerizable composition may be at least 1.48, 1.49, 1.50, 1.51, 1.52, 1.53, 1.54, 1.55, 1.56, 1.57, 1.58, 1.59, or 1.60. The polymerizable composition including the nanoparticles can have a refractive index as high as 1.70. (e.g. at least 1.61, 1.62, 1.63, 164, 1.65, 1.66, 1.67, 1.68, or 1.69) High transmittance in the visible light spectrum is also typically preferred.

The polymerizable composition is energy curable in time scales preferably less than five minutes such as for a brightness enhancing film having a 75 micron thickness. The polymerizable composition is preferably sufficiently crosslinked to provide a glass transition temperature that is typically greater than 45° C. The glass transition temperature can be measured by methods known in the art, such as Differential Scanning Calorimetry (DSC), modulated DSC, or Dynamic Mechanical Analysis. The polymerizable composition can be polymerized by conventional free radical polymerization methods.

Suitable monomers include for example phenoxy ethyl acrylate; phenoxy-2-methylethyl (meth)acrylate; phenoxyethoxyethyl(meth)acrylate; 3-hydroxy-2-hydroxypropyl meth)acrylate; benzyl(meth)acrylate, 4-(1-methyl-1-phenethyl)phenoxyethyl (meth)acrylate; phenylthio ethyl acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; phenoxy 2-methylethyl acrylate; 3-phenoxy-2-hydroxy propyl acrylate; 2-phenylphenoxy ethyl acrylate; 4-phenylphenoxy ethyl acrylate; 2,4-dibromo-6-sec-butylphenyl acrylate; 2,4-dibromo-6-isopropylphenyl acrylate; benzyl acrylate; phenyl acrylate; 2,4,6-tribromophenyl acrylate; ethoxylated Bisphenol A diacrylate; and mixtures thereof.

At least one of the ingredients of the polymerizable composition comprises at least two ethylenically unsaturated groups. It is preferred that the organic component comprises at least one ingredient that comprises two or more (meth) acrylate groups. If surface modified nanoparticles are employed that comprise sufficient polymerizable (meth)acrylate groups, all the monomers of the organic component may be mono functional.

Monomers that comprise at least two (meth)acrylate groups are also described as crosslinkers. Suitable crosslinkers include for example hexanediol diacrylate, pentaerythritol tri(meth)acrylate, pentaerythritol tetra(meth)acrylate, trimethylolpropane tri(meth)acrylate, trimethylolpropane ethoxylate tri(meth)acrylate, glyceryl tri(meth)acrylate, and pentaerythritol propoxylate tri(meth)acrylate. Any one or combination of crosslinkers may be employed. Since methacrylate groups tend to be less reactive than acrylate groups, the crosslinker(s) are preferably free of methacrylate functionality.

When a crosslinker is present, it is preferably present in the organic component of the polymerizable composition in an amount of at least about 2 wt-%. Typically, the amount of crosslinker is not greater than about 25 wt-%.

Various crosslinkers are commercially available. For example, pentaerythritol triacrylate (PETA) is commercially available from Sartomer Company, Exton, Pa. under the trade designation "SR444"; from Osaka Organic Chemical Industry, Ltd. Osaka, Japan under the trade designation "Viscoat #300"; from Toagosei Co. Ltd., Tokyo, Japan under the trade designation "Aronix M-305"; and from Eternal Chemical Co., Ltd., Kaohsiung, Taiwan under the trade designation "Etermer 235". Trimethylol propane triacrylate (TMPTA) is commercially available from Sartomer Company under the trade designations "SR351". TMPTA is also available from Toagosei Co. Ltd. under the trade designation "Aronix M-309". Further, ethoxylated trimethylolpropane triacrylate and ethoxylated pentaerythritol triacrylate are commercially available from Sartomer under the trade designations "SR454" and "SR494" respectively.

Provided that the organic component and polymerizable composition as a whole has the desired refractive index, the organic component can comprise other (e.g. lower refractive index) monomers. Suitable monomers may provide other beneficial characteristics such as improved adhesion or reduced viscosity. Suitable monomers include mono- or di-functional ethylenically unsaturated monomers such as (meth)acrylates or monomeric N-substituted or N,N-disubstituted (meth)acrylamides, especially acrylamide. These include N-alkylacrylamides and N,N-dialkylacrylamides, especially those containing $C_{1-4}$ alkyl groups. Examples are N-isopropylacrylamide, N-t-butylacrylamide, N,N-dimethylacrylamide, N,N-diethylacrylamide, N-vinyl pyrrolidone, N-vinyl caprolactam.

As described in Lu and Lu et al., a microstructure-bearing article (e.g. brightness enhancing film) can be prepared by a method including the steps of (a) preparing a polymerizable composition (i.e. the polymerizable composition of the invention); (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can be optionally be primed or otherwise be treated to promote adhesion of the optical layer to the base.

For the following defined terms, these definitions shall be applied, unless a different definition is given in the claims or elsewhere in this specification.

"Microstructure" is used herein as defined and explained in U.S. Pat. No. 4,576,850. Thus, it means the configuration of a surface that depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about +/−0.005 to +/−750 microns, as measured by an optical or electron microscope, through a representative characteristic length of the surface, e.g., 1-30 cm. Said average center line can be piano, concave, convex, aspheric or combinations thereof. Articles where said deviations are of low order, e.g., from +/−0.005 +/−0.1 or, preferably, +/−0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from +/−0.1 to +/−750 microns, and attributable to microstructure comprising a plurality of utilitarian discontinuities which are the same or different and spaced apart or contiguous in a random or ordered manner, are articles such as retroreflective prismatic sheeting, microstructured molds (e.g. for molding paste to prepare barrier ribs), linear Fresnel lenses, video discs and brightness enhancing films. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles.

"Organic component" refers to all of the components of the composition except for the inorganic nanoparticles.

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using an Abbe refractometer in the visible light region (available commercially, for example, from Fisher Instruments of Pittsburgh, Pa.). It is generally appreciated that the measured index of refraction can vary to some extent depending on the instrument.

"(Meth)acrylate" refers to both acrylate and methacrylate compounds.

"Polymerizable composition" refers to the total composition including the organic component that comprises at least one polymerizable monomer and the inorganic nanoparticles.

The term "nanoparticles" is defined herein to mean particles (primary particles or associated primary particles) with a diameter less than about 100 nm.

"Surface modified colloidal nanoparticle" refers to nanoparticles each with a modified surface such that the nanoparticles provide a stable dispersion.

"Aggregation" refers to a strong association between primary particles that may be chemically bound to one another. The breakdown of aggregates into smaller particles is difficult to achieve.

"Agglomeration refers to a weak association between primary particles which my be held together by charge or polarity and can be broken down into smaller entities.

"Primary particle size" refers to the mean diameter of a single (non-aggregate, non-agglomerate) particle.

"Volatile acid" refers to a monocarboxylic acids having six or less carbon atoms, such as acrylic acid, methacrylic acid, acetic acid, and mixtures thereof.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about."

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

The following ingredients were used in the preparation of the polymerizable compositions of the examples.

Trimethylolpropane triacrylate ("TMPTA) from Sartomer Co. (Exton, Pa.)

Tribromophenoxyethyl acrylate ("BR-31") from DAI-ICHI KOGYO SEIYAKU CO., LTD (Kyoto, Japan)

Phenoxyethyl acrylate (SR-339) from Sartomer Co. (Exton, Pa.)

A $ZrO_2$ sol was prepared according to U.S. patent application Ser. No. 11/027,426 filed Dec. 30, 2004 yielding a sol with 45.78% solids. The $ZrO_2$ was tested according to the following $ZrO_2$ Test Methods:

Photon Correlation Spectroscopy (PCS)

The volume-average particle size was determined by Photon Correlation Spectroscopy (PCS) using a Malvern Series 4700 particle size analyzer (available from Malvern Instruments Inc., Southborough, Mass.). Dilute zirconia sol samples were filtered through a 0.2 μm filter using syringe-applied pressure into a glass cuvette that was then covered. Prior to starting data acquisition the temperature of the sample chamber was allowed to equilibrate at 25° C. The supplied software was used to do a CONTIN analysis with an angle of 90 degrees. CONTIN is a widely used mathematical method for analyzing general inverse transformation problems that is further described in S. W. Provencher, *Comput. Phys. Commun.* 27, 229 (1982). The analysis was performed using 24 data bins. The following values were used in the calculations: refractive index of water equal to 1.333, viscosity of water equal to 0.890 centipoise, and refractive index of the zirconia particles equal to 1.9.

Two particle size measurements were calculated based on the PCS data. The intensity-average particle size, reported in nanometers, was equal to the size of a particle corresponding to the mean value of the scattered light intensity distribution. The scattered light intensity was proportional to the sixth power of the particle diameter. The volume-average particle size, also reported in nanometers, was derived from a volume distribution that was calculated from the scattered light intensity distribution taking into account both the refractive index of the zirconia particles and the refractive index of the dispersing medium (i.e., water). The volume-average particle size was equal to the particle size corresponding to the mean of the volume distribution.

The intensity-average particle size was divided by the volume-average particle size to provide a ratio that is indicative of the particle size distribution.

Crystalline Structure and Size (XRD Analysis)

The particle size of a dried zirconia sample was reduced by hand grinding using an agate mortar and pestle. A liberal amount of the sample was applied by spatula to a glass microscope slide on which a section of double coated tape had been adhered. The sample was pressed into the adhesive on the tape by forcing the sample against the tape with the spatula blade. Excess sample was removed by scraping the sample area with the edge of the spatula blade, leaving a thin layer of particles adhered to the adhesive. Loosely adhered materials remaining after the scraping were remove by forcefully tapping the microscope slide against a hard surface. In a similar manner, corundum (Linde 1.0 μm alumina polishing powder, Lot Number C062, Union Carbide, Indianapolis, Ind.) was prepared and used to calibrate the diffractometer for instrumental broadening.

X-ray diffraction scans were obtained using a Philips vertical diffractometer having a reflection geometry, copper $K_\alpha$ radiation, and proportional detector registry of the scattered radiation. The diffractometer was fitted with variable incident beam slits, fixed diffracted beam slits, and graphite diffracted beam monochromator. The survey scan was conducted from 25 to 55 degrees two theta (2θ) using a 0.04 degree step size and 8 second dwell time. X-ray generator settings of 45 kV and 35 mA were employed. Data collections for the corundum standard were conducted on three separate areas of several individual corundum mounts. Data was collected on three separate areas of the thin layer sample mount.

The observed diffraction peaks were identified by comparison to the reference diffraction patterns contained within the International Center for Diffraction Data (ICDD) powder diffraction database (sets 1-47, ICDD, Newton Square, Pa.) and attributed to either cubic/tetragonal (C/T) or monoclinic (M) forms of zirconia. The (111) peak for the cubic phase and (101) peak for the tetragonal phase could not be separated so these phases were reported together. The amounts of each zirconia form were evaluated on a relative basis and the form of zirconia having the most intense diffraction peak was assigned the relative intensity value of 100. The strongest line of the remaining crystalline zirconia form was scaled relative to the most intense line and given a value between 1 and 100.

Peak widths for the observed diffraction maxima due to corundum were measured by profile fitting. The relationship between mean corundum peak widths and corundum peak position (2θ) was determined by fitting a polynomial to these data to produce a continuous function used to evaluate the instrumental breadth at any peak position within the corundum testing range. Peak widths for the observed diffraction maxima due to zirconia were measured by profile fitting observed diffraction peaks. The following peak widths were evaluated depending on the zirconia phase found to be present:

Cubic/Tetragonal (C/T): (1 1 1)

Monoclinic (M): (−1 1 1), and (1 1 1)

A Pearson VII peak shape model with $K_{\alpha 1}$ and $K_{\alpha 2}$ wavelength components accounted for, and linear background model were employed in all cases. Widths were found as the peak full width at half maximum (FWHM) having units of degrees. The profile fitting was accomplished by use of the capabilities of the JADE diffraction software suite. Sample peak widths were evaluated for the three separate data collections obtained for the same thin layer sample mount.

Sample peaks were corrected for instrumental broadening by interpolation of instrumental breadth values from corundum instrument calibration and corrected peak widths converted to units of radians. The Scherrer equation was used to calculate the primary crystal size.

Crystallite Size $(D) = K\lambda/\beta(\cos\theta)$

In the Scherrer equation,
K = form factor (here 0.9);
λ = wavelength (1.540598 Å);
β = calculated peak width after correction for instrumental broadening (in radians) = [calculated peak FWHM−instrumental breadth](converted to radians) where FWHM is full width at half maximum; and θ = ½ the peak position (scattering angle).

The cubic/tetragonal crystallite size was measured as the average of three measurements using (1 1 1) peak.

Cubic/Tetragonal Mean Crystallite Size = $[D(1\ 1\ 1)_{area\ 1} + D(1\ 1\ 1)_{area\ 2} + D(1\ 1\ 1)_{area\ 3}]/3$ The monoclinic crystallite size was measured as the average of three measurement using the (−1 1 1) peak and three measurements using the (1 1 1) peak.

Monoclinic Mean Crystallite Size = $[D(-1\ 1\ 1)_{area\ 1} + D(-1\ 1\ 1)_{area\ 2} + D(-1\ 1\ 1)_{area\ 3} + D(1\ 1\ 1)_{area\ 1} + D(1\ 1\ 1)_{area\ 2} + D(1\ 1\ 1)_{area\ 3}]/6$ The weighted average of the cubic/tetragonal (C/T) and monoclininc phases (M) were calculated.

Weighted average = [(% C/T)(C/T size) + (% M)(M size)]/100

In this equation,
% C/T = the percent crystallinity contributed by the cubic and tetragonal crystallite content of the $ZrO_2$ particles;
C/T size = the size of the cubic and tetragonal crystallites;
% M = the percent crystallinity contributed by the monoclinic crystallite content of the $ZrO_2$ particles; and
M size = the size of the monoclinic crystallites.

Dispersion Index

The Dispersion Index is equal to the volume-average size measured by PCS divided by the weighted average crystallite size measured by XRD.

Weight Percent Solids

The weight percent solids were determined by drying a sample weighing 3 to 6 grams at 120° C. for 30 minutes. The percent solids can be calculated from the weight of the wet sample (i.e., weight before drying, $weight_{wet}$) and the weight of the dry sample (i.e., weight after drying, $weight_{dry}$) using the following equation.

wt-% solids = $100(weight_{dry})/weight_{wet}$

The results were as follows:

| | Intensity-average Size (nm) | Volume-average Size (nm) | Intensity-average:Volume-average Ratio |
|---|---|---|---|
| $ZrO_2$ Sol | 42.1 | 17.5 | 2.41 |

| | M Intensity | M Size (nm) | C/T Intensity | C/T Size (nm) Primary Particle Size | % C/T | XRD Average Size (nm) | Dispersion Index |
|---|---|---|---|---|---|---|---|
| $ZrO_2$ Sol | 9 | 6.5 | 100 | 8.0 | 92 | 7.9 | 2.21 |

Preparation of phthalic acid mono-(2-acryloyloxy-ethyl)ester

Mix 112.1 g. phthalic anhydride, 87.9 g 2-hydroxyethyl acrylate and 0.44 g. triethylamine in a round bottom flask. Bubble a small amount of dry air into the liquid. Mix and heat the reaction to 75° C. Hold the reaction at that temperature for six hours. Cool to room temperature. The product was analyzed and determined to be phthalic acid mono-(2-acryloyloxy-ethyl)ester by NMR. The product partially crystallizes over time.

Example 1 (Control)

The $ZrO_2$ sol (100.0 g), MEEAA (6.16 g), and 1-methoxy-2-propanol (50.0 g) were charged to a 1 L round bottom flask. Water and alcohol were removed via rotary evaporation to obtain a concentrated $ZrO_2$ sol. A 2/3/5 blend of TMPTA/PEA/BR31 (26.55 g), a 5% solution of hindered amine nitroxide inhibitor commercially available from Ciba Specialty Chemical, Inc. Tarrytown, N.Y. under the trade designation "Prostab 5198" in water (0.21 g), and 1-methoxy-2-propanol (20.0 g) were added to the concentrated $ZrO_2$ sol. Water and alcohol were removed via rotary evaporation. Methacrylic acid (7.92 g) and 1-methoxy-2-propanol (20.0 g) were added to the dispersion of $ZrO_2$ in resin. The remainder of the alcohol was removed via rotary evaporation. The resultant dispersion of $ZrO_2$ in acrylic monomers had a refractive index of 1.646 and contained 52.7% $ZrO_2$.

Example 2

The $ZrO_2$ sol (103.17 g), MEEAA (6.08 g), water (77.00 g), 1-methoxy-2-propanol (150.0 g), a 20.76% solution of maleic acid in 1-methoxy-2-propanol (6.31 g), a 2/3/5 blend of TMPTA/PEA/BR31 (26.82 g), and a 5% solution of Prostab 5198 in water (0.20 g) were charged to a 1 L round bottom flask. Water and 1-methoxy-2-propanol were removed via rotary evaporation to obtain a concentrated $ZrO_2$ sol with a refractive index of 1.540. 1-methoxy-2-propanol (70.0 g) and water (50.0 g) were added to the $ZrO_2$ sol. Water and 1-Methoxy-2-propanol were removed via rotary evaporation to obtain a concentrated $ZrO_2$ sol with a refractive index of 1.554. Phthalic acid mono-(2-acryloyloxy-ethyl)ester (3.28 g), 1-methoxy-2-propanol (10.0 g) and water (6.0 g) were charged to the concentrated $ZrO_2$ sol. Water and alcohol were removed via rotary evaporation to obtain a dispersion of $ZrO_2$ in acrylic resin with a refractive index of 1.645. 1-methoxy-2-propanol (2.0 g) and water (0.2 g) were charged to the $ZrO_2$ dispersion. The remainder of the alcohol and water were removed via rotary evaporation. The resultant dispersion of $ZrO_2$ in acrylic resin was approximately 52.4% $ZrO_2$ and had a refractive index of 1.6495.

Example 3

The $ZrO_2$ sol was ultrafiltered from 15 wt-% solids to 30 wt-% three times using a hollow fiber ultrafiltration membrane (model M21S-100-01P) available from Spectrum Labs (Rancho Dominguez, Calif.). The ultrafiltered $ZrO_2$ sol (180.0 g), MEEAA (6.07 g), 1-methoxy-2-propanol (100.0 g), a 4.2% solution of maleic acid in 1-methoxy-2-propanol (31.31 g), a 2/3/5 blend of TMPTA/PEA/BR31 (26.82 g), and a 5% solution of Prostab 5198 in water (0.22 g) were charged to a 1 L round bottom flask. Water and 1-methoxy-2-propanol were removed via rotary evaporation. 1-methoxy-2-propanol (60.0 g) and Phthalic acid mono-(2-acryloyloxy-ethyl)ester (3.20 g) were charged to the concentrated $ZrO_2$ sol. The remainder of the water and alcohol were removed via rotary evaporation. 1-methoxy-2-propanol (10.0 g) was charged to the $ZrO_2$ dispersion. The alcohol was removed via rotary evaporation. The resultant dispersion of $ZrO_2$ in acrylic resin was approximately 52.4% $ZrO_2$ and had a refractive index of 1.6505.

Method for Measuring Total Acids:

Acids in the resin were measured using a HP (Hewlett Packard) 5890 Series 2 Gas Chromatograph. The column used was a HP-5 (Crosslinked 5% PhMe Silicon) and was 30 ft in length, 0.53 inch diameter, and 1.5 micron film thickness. The injection temperature was 300° C. and the detector temp was 250° C. The method employed an initial temp of 40° C. and hold for 1 min then ramp at 20 C./min to 200° C. and hold for 5 minutes. Samples were prepared by adding 1 g of each of the $ZrO_2$ containing resin to 3 g of 3% ammonium hydroxide in water. The precipitate was filtered out using a syringe filter and the filtrate was injected in the GC.

TABLE 1

| | Residual Volatile Carboxylic Acids in Wt-% | |
|---|---|---|
| Example | Wt-% Acetic Acid | Wt-% Methacrylic Acid |
| 1 (control) | 1.40 | 3.15 |
| 2 | 0.38 | 0.00 |
| 3 | 0.35 | 0.00 |

By comparing Examples 2 and 3 to the control Example 1, there is an approximate 75% reduction in the acetic acid content of the uncured resin. Also, the use of methacrylic acid, another possible contributor to odor and increased factory strip times, is eliminated.

Example 4

$ZrO_2$ sol (130 g), MEEAA (7.2 g), 1-methoxy-2-propanol (90 g), phthalic acid mono-(2-acryloyloxy-ethyl) ester (1.8 g @ 50% solids in 1-methoxy-2-propanol), phthalic acid mono-[2-(naphthalene-2-ylsulfanyl)-ethyl]ester (17.4 g @ 50% solids in 1-methoxy-2-propanol), a 5/3/2 blend of BR 31/PEA/TMPTA (29.4 g) and ProStab 5198 (0.015 g) were charged to a 3 neck 1 L RB flask. Water and alcohol were removed via vacuum distillation such that the resultant dispersion was approximately 53.3% $ZrO_2$ in acrylate resin. The viscosity was measured using a Brookfield DV II+ viscometer with a small sample adapter, spindle S18 and a constant temperature water bath set at 149° F. The viscosity was reported at 393 cP. Refractive index was measured at 1.6455.

Example 5

$ZrO_2$ sol (130 g), MEEAA (6.9 g), 1-methoxy-2-propanol (90 g), phthalic acid mono-(2-acryloyloxy-ethyl) ester (4.6 g @ 50% solids in 1-methoxy-2-propanol), phthalic acid mono-[2-(naphthalene-2-ylsulfanyl)-ethyl]ester (7.4 g @ 50% solids in 1-methoxy-2-propanol), a 5/3/2 blend of BR 31/PEA/TMPTA (33.3 g) and ProStab 5198 (0.015 g) were charged to a 3 neck 1 L RB flask. Water and alcohol were removed via vacuum distillation such that the resultant dispersion was approximately 53.3% $ZrO_2$ in acrylate resin. The viscosity was measured using a Brookfield DV II+ viscometer with a small sample adapter, spindle S18 and a constant temperature water bath set at 149° F. The viscosity was reported at 441 cP. Refractive index was measured at 1.6450.

Brightness Enhancing Film Preparation

The composition of Example 4 and 5 were each independently prepared into a brightness enhancing film as described as follows:

An 8"×11" metal master consisting of linear rows of 90 degree prisms with a nominal pitch spacing of 50 microns, similar to the prism geometry pattern found on Vikuiti BEF II (commercially available from 3M Co., St. Paul, Minn.), was placed on a hot plate and heated to 140° F. A 4 ml bead of the polymerizable resin was applied to the master tool using a disposable pipette. Next, a 500 gauge PET available from Dupont Teijin Films as MELINEX 623 was placed on the bead of resin and master tool.

The PET film was oriented so the linear prisms are oriented approximately perpendicular (90°+/−20°) to the high gain axis of the film. The master tool, resin and PET were then passed through a heated nip roll at 160° F. with sufficient force for the resin to fill the master tool completely, while eliminating any entrained air. The filled master tool was then exposed to ultraviolet radiation from a "D-bulb" using a P150 power supply available from Fusion UV Systems, Inc. Gaithersburg, Md. at a line speed of 50 fpm for two passes. The PET film was then manually removed from the master tool. The prismatic coating formed on the PET film resulted in a coating thickness of approximately 25 microns.

Comparative Example A

Vikuiti™ BEF II 90/50 film (BEF II), sold by 3M, St Paul, Minn., is a microreplicated prismatic structured brightness enhancement film having a prism angle of 90 degree and a pitch (distance between prism peaks) of 50 micrometers. The prism peaks in Comparative Example A are sharp.

The gain of the brightness enhancing films prepared from the polymerizable compositions of Examples 4 and 5 as well as the gain of the brightness enhancing film of Comparative Example A was evaluated according to the following Gain Test Method.

Gain Test Method

Optical performance of the films was measured using a SpectraScan™ PR-650 SpectraColorimeter with an MS-75 lens, available from Photo Research, Inc, Chatsworth, Calif. The films were placed on top of a diffusely transmissive hollow light box. The diffuse transmission and reflection of the light box can be described as Lambertian. The light box was a six-sided hollow cube measuring approximately 12.5 cm×12.5 cm×11.5 cm (L×W×H) made from diffuse PTFE plates of ~6 mm thickness. One face of the box is chosen as the sample surface. The hollow light box had a diffuse reflectance of ~0.83 measured at the sample surface (e.g. ~83%, averaged over the 400-700 nm wavelength range, measurement method described below). During the gain test, the box is illuminated from within through a ~1 cm circular hole in the bottom of the box (opposite the sample surface, with the light directed towards the sample surface from the inside). This illumination is provided using a stabilized broadband incandescent light source attached to a fiber-optic bundle used to direct the light (Fostec DCR-II with ~1 cm diameter fiber bundle extension from Schott-Fostec LLC, Marlborough Mass. and Auburn, N.Y.). A standard linear absorbing polarizer (such as Melles Griot 03 FPG 007) is placed between the sample box and the camera. The camera is focused on the sample surface of the light box at a distance of ~34 cm and the absorbing polarizer is placed ~2.5 cm from the camera lens. The luminance of the illuminated light box, measured with the polarizer in place and no sample films, was >150 cd/m². The sample luminance is measured with the PR-650 at normal incidence to the plane of the box sample surface when the sample films are placed parallel to the box sample surface, the sample films being in general contact with the box. The relative gain is calculated by comparing this sample luminance to the luminance measured in the same manner from the light box alone. The entire measurement was carried out in a black enclosure to eliminate stray light sources. When the relative gain of film assemblies containing reflective polarizers was tested, the pass axis of the reflective polarizer was aligned with the pass axis of the absorbing polarizer of the test system. Relative gain values reported for prismatic films were generally obtained with the prism grooves of the film nearest the absorbing polarizer being aligned perpendicular to the pass axis of the absorbing polarizer.

The diffuse reflectance of the light box was measured using a 15.25 cm (6 inch) diameter Spectralon-coated integrating sphere, a stabilized broadband halogen light source, and a power supply for the light source all supplied by Labsphere (Sutton, N.H.). The integrating sphere had three opening ports, one port for the input light (of 2.5 cm diameter), one at 90 degrees along a second axis as the detector port (of 2.5 cm diameter), and the third at 90 degrees along a third axis (i.e. orthogonal to the first two axes) as the sample port (of 5 cm diameter). A PR-650 Spectracolorimeter (same as above) was focused on the detector port at a distance of ~38 cm. The reflective efficiency of the integrating sphere was calculated using a calibrated reflectance standard from Labsphere having ~99% diffuse reflectance (SRT-99-050). The standard was calibrated by Labsphere and traceable to a NIST standard (SRS-99-020-REFL-51). The reflective efficiency of the integrating sphere was calculated as follows:

$$\text{Sphere brightness ratio}=1/(1-R\text{sphere}*R\text{standard})$$

The sphere brightness ratio in this case is the ratio of the luminance measured at the detector port with the reference sample covering the sample port divided by the luminance measured at the detector port with no sample covering the sample port. Knowing this brightness ratio and the reflectance of the calibrated standard (Rstandard), the reflective efficiency of the integrating sphere, Rsphere, can be calculated. This value is then used again in a similar equation to measure a sample's reflectance, in this case the PTFE light box:

$$\text{Sphere brightness ratio}=1/(1-R\text{sphere}*R\text{sample})$$

Here the sphere brightness ratio is measured as the ratio of the luminance at the detector with the sample at the sample port divided by the luminance measured without the sample. Since Rsphere is known from above, Rsample can be calculated. These reflectances were calculated at 4 nm wavelength intervals and reported as averages over the 400-700 nm wavelength range.

For each of the brightness enhancing film tested an assembly was prepared by stacking two pieces of the same type of film (e.g. two pieces of Comparative A). The prismatic microstructured surface of the bottom film was contacted with the base layer substrate of the top film such that the prisms of the bottom film were orthogonal with the prisms of the top film. The measured gain of this crossed sheet assembly was as follows.

| | |
|---|---|
| Brightness Enhancing Film Prepared from Example 4 | 3.06 |
| Brightness Enhancing Film Prepared from Example 5 | 3.13 |
| Comparative Examples A | 2.77 |

What is claimed is:

1. A brightness enhancing film comprising the reaction production of a polymerizable resin composition including inorganic nanoparticles surface modified with a surface treatment comprising a monocarboxylic acid having a refractive index of at least 1.50.

2. The brightness enhancing film of claim 1 wherein the surface treatment comprises an aromatic group.

3. The brightness enhancing film of claim 2 wherein the surface treatment comprises a phthalate group.

4. The brightness enhancing film of claim 1 wherein the surface treatment further comprises at least one polyether monocarboxylic acid.

5. The brightness enhancing film of claim 4 wherein the polyether monocarboxylic acid has the general formula:

$$CH_3-[O-(CH_2)_y]_x-X_2-(CH_2)_n-COOH$$

wherein $X_2$ is selected from the group consisting of —O—, —S—, —C(O)O— and —C(O)NH; n ranges from about 1-3; x ranges from about 1-10; and y ranges from about 1-4.

6. The brightness enhancing film of claim 5 wherein the polyether monocarboxylic acid is selected from the group consisting of 2-[2-(2-methoxyethoxy)ethoxy]acetic acid, 2-(2-methoxyethoxy) acetic acid, succinic acid mono-[2-(2-methoxy-ethoxy)-ethyl]ester, maleic acid mono-[2-(2-methoxy-ethoxy)-ethyl]ester, and glutaric acid mono-[2-(2-methoxy-ethoxy)-ethyl]ester, and mixtures thereof.

7. The brightness enhancing film of claim 1 wherein the surface treatment further comprises a compatibilizer and the compatibilizer comprises an ethylenically unsaturated group.

8. A brightness enhancing film of claim 7 wherein the compatibilizer comprises a (meth)acrylate group.

9. The brightness enhancing film of claim 1 wherein the inorganic nanoparticles comprise adsorbed volatile acid and the adsorbed volatile acid content of the brightness enhancing film is less than 3 wt-%.

10. The brightness enhancing film of claim 9 wherein the adsorbed volatile acid is acrylic acid, methacrylic acid, acetic acid, or a mixture thereof.

11. The brightness enhancing film of claim 9 wherein the brightness enhancing film comprises non-volatile acid and the non-volatile acid content ranges up to about 15 wt-%.

12. The brightness enhancing film of claim 1 wherein the surface treatment is free of silane.

13. The brightness enhancing film of claim 1 wherein the amount of inorganic nanoparticles ranges from 40 wt-% to 60 wt-%.

14. The brightness enhancing film of claim 1 wherein the inorganic nanoparticles are selected from the group consisting of zirconia, titania, and mixtures thereof.

15. The brightness enhancing film of claim 1 wherein the inorganic nanoparticles have a primary particle that ranges in size from 5 nm to 75 nm.

16. An optical article comprising the reaction production of a polymerizable resin composition including inorganic nanoparticles surface modified with a surface treatment comprising at least one monocarboxylic acid compatibilizer having a polar group in combination with at least one surface treatment selected from i) a monocarboxylic acid having a refractive index of at least 1.50;

ii) a monocarboxylic acid having a Mn of at least 200 g/mole that copolymerizes with the polymerizable resin;

iii) a dicarboxylic acid;

and mixtures of two or more of i), ii), and iii).

17. The brightness enhancing film of claim 16 wherein i) comprises an aromatic group.

18. The optical article of claim 16 wherein the optical article is a film optionally having a microstructured surface.

19. A method of surface modifying inorganic nanoparticles by combining inorganic nanoparticles with a surface treatment comprising at least one monocarboxylic acid compatibilizer having a polar group in combination with at least one surface treatment selected from i) a monocarboxylic acid having a refractive index of at least 1.50 ii) a monocarboxylic acid having a Mn of at least 200 g/mole and (meth)acrylate group;

and mixtures of two or more of i) and ii).

20. The method of claim 19 wherein the inorganic nanoparticles comprise absorbed volatile acid and the adsorbed volatile acid content after surface modification is less than 3 wt-%.

21. Inorganic nanoparticles comprising a surface treatment comprising at least one monocarboxylic acid having a polar group in combination with at least one surface treatment selected from i) a monocarboxylic acid having a refractive index of at least 1.50 ii) a monocarboxylic acid having a Mn of at least 200 g/mole and (meth)acrylate group; and mixtures of two or more of i)and ii).

* * * * *

UNITED STATES PATENT AND TRADEMARK OFFICE
CERTIFICATE OF CORRECTION

PATENT NO. : 7,547,467 B2
APPLICATION NO. : 11/559543
DATED : June 16, 2009
INVENTOR(S) : David B. Olson It is certified that error appears in the above-identified patent and that said Letters Patent is hereby corrected as shown below:

Column 4
Line 41-42, Delete "miscroscopy" and insert -- microscopy --, therefor.
Line 52, Delete "defraction" and insert -- diffraction --, therefor.

Column 6
Line 37, Delete "–$C_n$ $H_{2n}$–" and insert -- –$C_nH_{2n}$– --, therefor.
Line 51, Delete "–O– –S–," and insert -- –O–, –S–, --, therefor.

Column 7
Line 38, Delete "unsatured" and insert -- unsaturated --, therefor.

Column 11
Line 17-18, Delete "phenoxyethoxyethyl(meth)acrylate;" and
insert -- phenoxyethoxyethyl (meth)acrylate; --, therefor.
Line 19, Delete "meth)acrylate;" and insert -- (meth)acrylate; --, therefor.
Line 39, Delete "mono functional." and insert -- monofunctional. --, therefor.

Column 13
Line 43, Delete "my" and insert -- may --, therefor.

Column 16
Line 12, Delete "D(1 1)" and insert -- D(1 1 1) --, therefor.
Line 15, Delete "monoclininc" and insert -- monoclinic --, therefor.

Column 21
Line 16, In Claim 5, delete "–C(O)NH;" and insert -- –C(O)NH–; --, therefor.
Line 21, In Claim 6, delete ") acetic acid," and insert -- )acetic acid, --, therefor.

Column 22
Line 30, In Claim 19, delete "and" and insert -- and a --, therefor.
In Claim 21,
  delete "21. Inorganic nanoparticles comprising a surface treatment
comprising at least one monocarboxylic acid having a polar
group in combination with at least one surface treatment
elected from
   i) a monocarboxylic acid having a refractive index of at
      least 1.50

UNITED STATES PATENT AND TRADEMARK OFFICE
CERTIFICATE OF CORRECTION

PATENT NO. : 7,547,467 B2
APPLICATION NO. : 11/559543
DATED : June 16, 2009
INVENTOR(S) : David B. Olson It is certified that error appears in the above-identified patent and that said Letters Patent is hereby corrected as shown below:

ii) a monocarboxylic acid having a Mn of at least 200
     g/mole and (meth)acrylate group; and mixtures of two or
     more of i)and ii)."

and insert -- 21. Inorganic nanoparticles comprising a surface treatment comprising at least one monocarboxylic acid having a polar group in combination with at least one surface treatment elected from
   i) a monocarboxylic acid having a refractive index of at
     least 1.50
   ii) a monocarboxylic acid having a Mn of at least 200
     g/mole and a (meth)acrylate group; and
     mixtures of two or more of i) and ii). --, therefor.

Signed and Sealed this

Twenty-fifth Day of August, 2009

David J. Kappos
*Director of the United States Patent and Trademark Office*